(12) United States Patent
Hirai

(10) Patent No.: US 6,493,108 B1
(45) Date of Patent: Dec. 10, 2002

(54) IMAGE PROCESSING APPARATUS, DATA PROCESSING METHOD THEREFOR, AND STORAGE MEDIUM FOR STORING COMPUTER READABLE PROGRAM THEREFOR

(75) Inventor: Shinya Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/174,327

(22) Filed: Oct. 19, 1998

(30) Foreign Application Priority Data

Oct. 21, 1997 (JP) .............................................. 9-288562

(51) Int. Cl.$^7$ ............................................. G06F 12/00
(52) U.S. Cl. ..................... 358/1.18; 358/1.15; 358/1.17
(58) Field of Search ................................ 358/1.1, 1.12, 358/1.13, 1.14, 1.15, 1.17, 403, 453, 487, 506, 527, 538, 508, 407; 348/231, 232, 239; 396/567, 639

(56) References Cited

U.S. PATENT DOCUMENTS 5,574,533 A * 11/1996 Itoh ............................ 396/639
5,633,678 A * 5/1997 Parulski et al. ............. 348/232
5,666,215 A * 9/1997 Fredlund et al. ............ 358/487

* cited by examiner

Primary Examiner—Mark Wallerson
(74) Attorney, Agent, or Firm—Fitzpatrick, Cella, Harper & Scinto

(57) ABSTRACT

Image data and the image-reproduction instruction data corresponding to the image data are stored in a recording medium. A specified-image reading section selectively reads the image data intended to be reproduced by the user, among the image data recorded in the recording medium. A signal processing section and a layout processing section generate a sheet used for checking the contents of the image data for which reproduction is specified, before the corresponding image is reproduced. An output unit outputs the sheet.

25 Claims, 8 Drawing Sheets

PF-3

Mr./Mr. NNN    PRINT ORDER CHECK SHEET

L1                L2                L3                L4

001.jpg 1 PIECE    003.jpg 1 PIECE    005.jpg 3 PIECES    012.jpg 2 PIECES

L5                L6                L7

PF-5

014.jpg 1 PIECE    015.jpg 1 PIECE    020.jpg 5 PIECES    TOTAL 14 PIECES

PF-1    PF-2

DATE OF ORDER : PPP QQ, RRR TIME : YY : ZZ
XXXX PRINTING SERVICE COMPANY

PF-4

\<PRE\>
CIFF_VERSION = 1.0
\<IMG SRC = "A00.JPG"\>
CIFF_PRINT_COUNT = 2
\<IMG SRC = "A03.JPG"\>
⋮

FIG. 6

RECORDING MEDIUM SUCH AS FLOPPY DISK OR CD-ROM

| DIRECTORY INFORMATION |
|---|
| PROGRAM CODE GROUPS CORRESPONDING TO STEPS IN FLOWCHART SHOWN IN FIG. 4 |
| |

MEMORY MAP OF RECORDING MEDIUM

FIG. 8

| IMAGE COUNT | HORIZONTAL PRINT COUNT | VERTICAL PRINT COUNT | HORIZONTAL IMAGE SIZE | VERTICAL IMAGE SIZE |
|---|---|---|---|---|
| 1-2 | 2 | 1 | $x_0$ | $y_0$ |
| 3-4 | 2 | 2 | $x_1$ | $y_1$ |
| 5-6 | 3 | 2 | $x_2$ | $y_2$ |
| 7-9 | 3 | 3 | $x_3$ | $y_3$ |
| ⋮ | ⋮ | ⋮ | ⋮ | ⋮ |

FIG. 9

PRINT ORDER CHECK SHEET

⋯ 1 PIECE   ⋯ 1 PIECE   ⋯ 3 PIECES   ⋯ 2 PIECES

⋯ 1 PIECE   ⋯ 1 PIECE   ⋯ 5 PIECES   TOTAL 14 PIECES

XXXX PRINTING SERVICE COMPANY

IMAGE PROCESSING APPARATUS, DATA PROCESSING METHOD THEREFOR, AND STORAGE MEDIUM FOR STORING COMPUTER READABLE PROGRAM THEREFOR

BACKGROUND OF THE INVENTION

1. Field of the Invention

The present invention relates to an image processing apparatus for controlling reproduction output processing applied to image data recorded in a recording medium, a data processing method therefor, and a storage medium for storing a program which can be read by a computer and which controls the image processing apparatus.

2. Description of the Related Art

Each frame image in a photographic film can be generally reproduced by an additional printing service.

In this additional printing service, a printing count and a mark are put on a semi-transparent negative holder which accumulates a developed film, the holder is submitted to a developing laboratory, and the laboratory identifies an image to be reproduced (printed additionally) and prints it.

A photo CD system has been recently used in which an image on a film is read, the read image data is written into a CD-ROM, and the image data is read from the CD-ROM to be displayed on an image display unit.

Such a CD-ROM system is configured such that image data stored on a CD-ROM is read by a computer system and output by a high-image-quality printer to obtain a printed image.

Since such a high-image-quality printer is expensive and individuals usually cannot afford to have it, however, a printing service at a developing laboratory is usually used to obtain a printed image.

Generally, a CD-ROM and a memo on which information, such as an image number on an index print, for specifying an image data stored in the CD-ROM are submitted.

As computer technologies have been developed and personal computers have become to be widely used, and image input units such as a digital camera have been spread, individuals have come to be able to easily handle high-resolution digital image data.

Such image data is stored in an information recording medium in various image-file formats, including a tag image file format (TIFF), PICT, a joint photographic experts group (JPEG) format and RAW. The image data is usually printed by a printer connected to a computer which an individual has.

Satisfactory printing cannot be performed in some cases by the printer which an individual has, due to the limit of its image expression processing capability.

To respond to a demand of higher-image-quality printing, a developing laboratory, a photo shop, a photo finishing shop, or a personal-computer shop provides a printing service for reproducing image data stored in an information recording medium, by a high-performance printer.

To use such a printing service, image data needs to be submitted for printing to a place where the service is provided. Recently, image data can be transmitted through a communication line for printing, but still it is usual to submit or carry an information recording medium which stores image data to a place where the service is provided.

It is necessary to specify the desired image among the image data stored in an information recording medium to use such an image printing service. Therefore, the customer who requires the printing service needs to inform an image printing service shop of the number or name corresponding to the desired image by a memo in order to specify the image among the image data stored in an information recording medium.

Then, the image printing service shop selects the image which the customer has specified among the image data stored in the information recording medium, according to the number or name specified by the customer for printing.

Generally, complicated operations are required in a computer system used for the printing service. Therefore, it has not been easy for a usual shop assistant to select the image to be printed and to print it.

A person is required for actual printing to specify the desired image among the image data stored in the information recording medium. In addition, the time required for printing is restricted.

To solve these problems, a system is used in which image data and image-reproduction instruction data for specifying whether the image data is to be reproduced or not are stored in an information recording medium, and when image data stored in the information recording medium is reproduced, the desired image data is read from the information recording medium among the image data according to the image data and the image-reproduction instruction data stored in the information recording medium to output the reproduction data. With this system, the customer can use a printing service just by bringing a recording medium which stores image data and image-reproduction instruction data to a printing service shop, without specifying an image to be printed by a memo.

If the customer erroneously stores image-reproduction instruction data in a recording medium such that an image different from the image which the customer wanted to specify in the recording medium is printed, the erroneous image is printed out. Although the desired image is printed, the number of printed images may be incorrect.

If image-reproduction instruction data is incorrect, since the fact is not found until printing is performed, a printed image may become wasteful. In this case, another printing is required, and thereby additional cost and time are necessary.

When the customer brings a recording medium to a shop, an image specified for printing cannot be directly checked. If image-reproduction instruction data is falsified to specify an excessive printing count, nobody can check it.

Image data stored in a recording medium is controlled by its file name. If the file name is falsified, since it cannot be checked, it is difficult to show whether the image specified for printing is actually printed.

SUMMARY OF THE INVENTION

Accordingly, it is an object of the present invention to provide an image processing apparatus which allows the user to select the desired image data to be reproduced among image data stored in a recording medium according to the image-reproduction instruction data corresponding to the image data, stored in the recording medium in addition to the image data in order to reduce a burden of specifying an image to be reproduced and in order to allow the intended number of the image to be efficiently reproduced without an and which outputs a sheet used for checking in advance before image reproduction the contents of the image data specified to be reproduced, in order to modify a reproduction instruction by easily determining whether the reproduction instruction is correct, to reduce burdens of the customer and the service provider in an image processing output service, and to avoid providing an unexpected reproduction image processing service due to erroneous instructions, a data processing method for the image processing apparatus, and a storage medium for storing a program which can be read by a computer and which controls the image processing apparatus.

The foregoing object is achieved in one aspect of the present invention through the provision of an image processing apparatus including: a recording medium in which the specified number of certain image data and the image-reproduction instruction data corresponding to the image data are stored; reading means for selecting image data according to the image-reproduction instruction data in the recording medium and for reading it; generating means for generating arranged output data according to the image-reproduction instruction data, for each image data selectively read by the reading means; and output means for outputting a sheet used for checking the instructions on the image data to be output from the recording medium, according to the output data generated by the generating means.

Therefore, image-reproduction instruction information which indicates an image the user wants to reproduce is recorded on the same recording medium as image data, a group of image data to be reproduced according to the image-reproduction instruction information can be image-output on the form sheet, and image-data reproduction instructions can be checked before the image data is reproduced. Consequently, it can be easily determined whether the instructions have an error. In addition, since the form sheet and the reproduced image can be verified at any time, when a person who asks image reproduction does not perform image reproduction processing, an error in instructions of the user or the processor and falsification are prevented and the best image-reproduction service can be offered.

The foregoing object is achieved in another aspect of the present invention through the provision of an image processing apparatus including: a recording medium in which the specified number of the image data and the image-reproduction instruction data corresponding to the image data are recorded; reading means for selecting image data according to the image-reproduction instruction data in the recording medium and for reading it; generating means for generating arranged output data according to the image-reproduction instruction data, for each image data selectively read by the reading means; and output means for outputting the output data generated by the generating means.

Since image-reproduction instruction information which indicates an image the user wants to reproduce is recorded on the same recording medium as image data, a burden to a person who asks image reproduction, of specifying an image to be reproduced to a person who performs image-reproduction processing can be reduced.

A person who performs image-reproduction processing can efficiently obtain the required number of reproduction images by efficiently reading the intended image data among the image data recorded in the recording medium passed by a person who has asked image reproduction.

The recording medium may be portable. In this case, a person who asks image reproduction can easily bring the recording medium in which image data is recorded to an image-processing service shop having an output unit.

The recording medium may be formed so as to be able to be mounted to a digital camera. In this case, only the intended image can be specified for reproduction among a plurality of image data taken by the digital camera.

In the image processing apparatus, an image indicating the output count of each image data may be added to the image data.

The foregoing object is achieved in still another aspect of the present invention through the provision of a data processing method for an image processing apparatus which can access a recording medium in which the specified number of certain image data and the image-reproduction instruction data corresponding to the image data are stored, the data processing method including: a reading step for selecting image data according to the image-reproduction instruction data in the recording medium and for reading it; a generating step for generating arranged output data according to the image-reproduction instruction data, for each image data selectively read in the reading step; and an output step for outputting a sheet used for checking the instructions on the image data to be output from the recording medium, according to the output data generated in the generating step.

Therefore, image-reproduction instruction information which indicates an image the user wants to reproduce is recorded on the same recording medium as image data, a group of image data to be reproduced according to the image-reproduction instruction information can be image-output on the form sheet, and image-data reproduction instructions can be checked before the image data is reproduced. Consequently, it can be easily determined whether the instructions have an error. In addition, since the form sheet and the reproduced image can be verified at any time, when a person who asks image reproduction does not perform image reproduction processing, an error in instructions of the user or the processor and falsification are prevented and the best image-reproduction service can be offered.

The recording medium may be portable.

The recording medium may be formed so as to be able to be mounted to a digital camera.

In the data processing method, an image indicating the output count of each image data may be added to the image data.

The foregoing object is achieved in yet another aspect of the present invention through the provision of a storage medium for storing a program which can be read by a computer and which controls an image processing apparatus that can access a recording medium in which the specified number of certain image data and the image-reproduction instruction data corresponding to the image data are stored, the program including: a reading step for selecting image data according to the image-reproduction instruction data in the recording medium and for reading it; a generating step for generating arranged output data according to the image-reproduction instruction data, for each image data selectively read in the reading step; and an output step for outputting a sheet used for checking the instructions on the image data to be output from the recording medium, according to the output data generated in the generating step.

Therefore, image-reproduction instruction information which indicates an image the user wants to reproduce is recorded on the same recording medium as image data, a group of image data to be reproduced according to the image-reproduction instruction information can be image-output on the form sheet, and image-data reproduction instructions can be checked before the image data is reproduced. Consequently, it can be easily determined whether the instructions have an error. In addition, since the form sheet and the reproduced image can be verified at any time, when a person who asks image reproduction does not perform image reproduction processing, an error in instructions of the user or the processor and falsification are prevented and the best image-reproduction service can be offered.

The recording medium may be portable.

The recording medium may be formed so as to be able to be mounted to a digital camera.

In the storage means, an image indicating the output count of each image data may be added to the image data.

The foregoing object is achieved in a further aspect of the present invention through the provision of a data processing method for an image processing apparatus which can access the recording medium in which the specified number of the image data and the image-reproduction instruction data corresponding to the image data are stored, the data processing method including: a reading step for selecting image data according to the image-reproduction instruction data in the recording medium and for reading it; a generating step for generating arranged output image data according to the image-reproduction instruction data, for each image data selectively read in the reading step; and an output step for outputting the arranged output image data generated in the generating step.

Therefore, a person who performs image-reproduction processing can efficiently obtain the required number of reproduction images by efficiently reading the intended image data among the image data recorded in the recording medium passed by a person who has asked image reproduction.

The foregoing object is achieved in a still further aspect of the present invention through the provision of a storage medium for storing a program which can be read by a computer and which controls an image processing apparatus that can access a recording medium in which the specified number of the image data and the image-reproduction instruction data corresponding to the image data are stored, the storage medium including: a reading step for selecting image data according to the image-reproduction instruction data in the recording medium and for reading it; a generating step for generating arranged output image data according to the image-reproduction instruction data, for each image data selectively read in the reading step; and an output step for outputting the arranged output image data generated in the generating step.

Therefore, a person who performs image-reproduction processing can efficiently obtain the required number of reproduction images by efficiently reading the intended image data among the image data recorded in the recording medium passed by a person who has asked image reproduction.

Since the image-reproduction instruction data indicating an image to be reproduced, which corresponds to the image data, is stored in the recording medium in addition to the image data, a burden of selecting the image data the user intends to be reproduced among the image data recorded in the recording medium, according to the image-reproduction instruction data, and of specifying reproduction thereof is reduced, and the intended number of reproduction images can be efficiently obtained without an error. In addition, a form sheet used for checking the contents of the image data to be reproduced can be output before the image data is reproduced. Furthermore, it is easily determined whether reproduction instruction contents have an error, and the contents can be changed if they have an error. A burden to a person who asks for image processing output service and a service provider is reduced, and an unexpected reproduction image processing service due to an instruction error can be avoided.

BRIEF DESCRIPTION OF THE DRAWINGS

FIG. 6 is a view showing a memory map of a recording medium in which various data processing programs are stored which can be read by a printing system to which an image processing system according to the present invention can be applied.

FIG. 8 is a table used for determining the size and layout of output images.

FIG. 9 is a view showing another type of print order check sheet.

DESCRIPTION OF THE PREFERRED EMBODIMENTS

First embodiment

Figure 1:
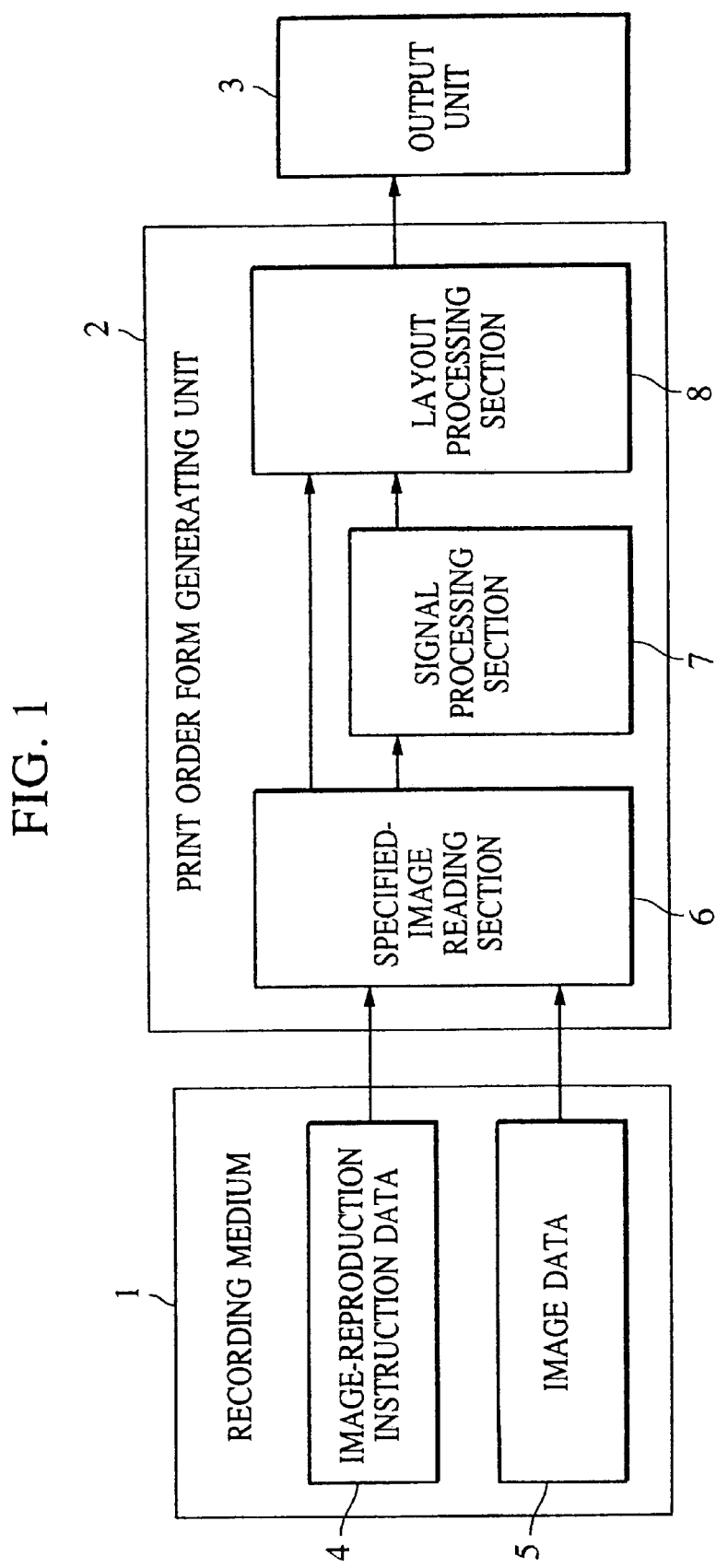
FIG. 1 is a block diagram of an image processing system according to a first embodiment of the present invention.

FIG. 1 is a block diagram of an image processing system according to a first embodiment of the present invention. The system includes a recording medium 1, a print order form generating unit 2, and an output unit 3. The print order form generating unit 2 may be formed of a personal computer which performs data processing under a general-purpose operating system such as Windows 95 (product name). In that case, image data 5 and image-reproduction instruction data 4 stored in the recording medium are read through an external unit (recording-medium reading unit) according to an application program stored in a storage unit such as a hard disk, and the CPU (not shown) performs signal processing and layout processing through a memory according to the application program.

In the figure, the recording medium 1 is formed, for example, of a floppy disk, a magneto-opticial disk, a CD-R, a Zip (product name), and a memory card which includes a flash memory, and records the image-reproduction instruction data 4 and the image data 5 in a certain format. The recording medium 1 is disposed in a medium unit (not shown), and image data taken by a digital camera, image data read by a scanner, and image data generated by an application software running on a personal computer are written into the recording medium.

In a print order form generating unit 2, a specified-image reading section 6 selectively reads image data specified to be reproduced, from the image data 5 according to the image-reproduction instruction data 4.

A signal processing section 7 applies thinning-out processing and changing-to-monochrome processing to the read image data 5 to form data suited to layout processing, described later. A layout processing section 8 arranges the image data processed by the signal processing section 7 and information, such as an image number, an image name, and a printing count, constituting image-reproduction instruction data in an easy-to-see manner. The output unit 3 prints out the arranged print order form image.

Figures 2, 3:
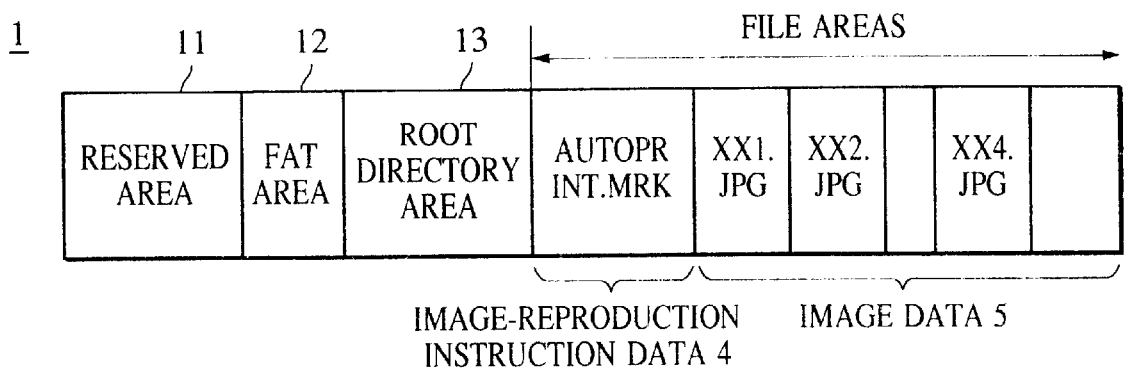
FIG. 2 is a view showing a data structure of image data and image-reproduction instruction data shown in FIG. 1.
FIG. 3 is a view showing a format of the image-reproduction instruction data shown in FIG. 1.

The recording medium 1 stores the image data 5 and the image-reproduction instruction data 4 in a data structure shown in FIG. 2.

FIG. 2 shows a data structure of the image data 5 and the image-reproduction instruction data 4 shown in FIG. 1. The same symbols as those used in FIG. 1 are assigned to the same portions.

In FIG. 2, the recording medium 1 is formed of a reserved area 11, an file allocation table (FAT) area 12, a root directory area 13, an area for storing the image-reproduction instruction data 4, and areas for storing the image data 5.

The image data 5 is recorded in a usual method such as JPEG and TIFF. The image-reproduction instruction data 4 needs to be recorded in a format which can be read by the specified-image reading section 6 in the print order form generating unit 2, and has, for example, a format shown in FIG. 3.

FIG. 3 shows a format of the image-reproduction instruction data 4 shown in FIG. 1. The image-reproduction instruction data 4 is written in a format which can be read by the specified-image reading section 6.

In FIG. 3, <IMG SRC="XXX"> indicates that data "XXX" is reproduced, and CIFF_PRINT_COUNT=2 indicates that the image data specified immediately before that line, "A00.JPG," is printed twice.

If this line is not specified, one print is output. CIFF_PRINT_COUNT=1 may be specified. The image-reproduction instruction data 4 always includes the number or name of image data to be printed and its print count.

Structural features in the present embodiment will be described by referring to FIG. 1.

Since the image processing apparatus configured as described above is provided with the recording medium 1 in which the specified number of the image data 5 and the image-reproduction instruction data 4 corresponding to the image data 5 are recorded, reading means (specified-image reading section 6) for selecting image data in the recording medium according to the image-reproduction instruction data 4 and for reading it, generating means (signal processing section 7 and layout processing section 8) for generating arranged output data according to the image-reproduction instruction data 4, for each image data selectively read by the reading means, and output means (output unit 3) for outputting a form sheet used for checking instructions on the image data to be output from the recording medium 1, according to the output data generated by the generating means, image-reproduction instruction information which indicates an image the user wants to reproduce is recorded on the same recording medium as image data, a group of image data to be reproduced according to the image-reproduction instruction information can be image-output on the form sheet, and image-data reproduction instructions can be checked before the image data is reproduced. Therefore, it can be easily determined whether the instructions have an error. In addition, since the form sheet and the reproduced image can be verified at any time, when a person who asks image reproduction does not perform image reproduction processing, an error in instructions of the user or the processor and falsification are prevented and the best image-reproduction service can be offered.

Since the image processing apparatus includes the recording medium 1 in which the specified number of the image data 5 and the image-reproduction instruction data 4 corresponding to the image data 5 are recorded, reading means (specified-image reading section 6) for selecting image data in the recording medium according to the image-reproduction instruction data 4 and for reading it, generating means (signal processing section 7 and layout processing section 8) for generating arranged output data according to the image-reproduction instruction data 4, for each image data selectively read by the reading means, and output means (output unit 3) for outputting the output data generated by the generating means, image-reproduction instruction information which indicates an image the user wants to reproduce is recorded on the same recording medium as image data. Therefore, a burden to a person who asks image reproduction, of specifying an image to be reproduced to a person who performs image-reproduction processing can be reduced.

A person (service provider) who performs image-reproduction processing can efficiently obtain the required number of reproduction images by efficiently reading the intended image data among the image data 5 recorded in the recording medium 1 passed by a person who asks image reproduction.

Since the recording medium 1 is formed of a portable recording medium, such as a floppy disk, a memory card, and a CD, a person who asks image reproduction can easily bring the recording medium 1 in which image data is recorded to an image-processing service shop having an output unit.

Since the recording medium 1 is configured such that it can be mounted on a digital camera, only the intended image can be specified for reproduction among a plurality of image data taken by the digital camera.

A procedure of print order form generating processing will be described below by referring to a flowchart shown in FIG. 4.

Figure 4:
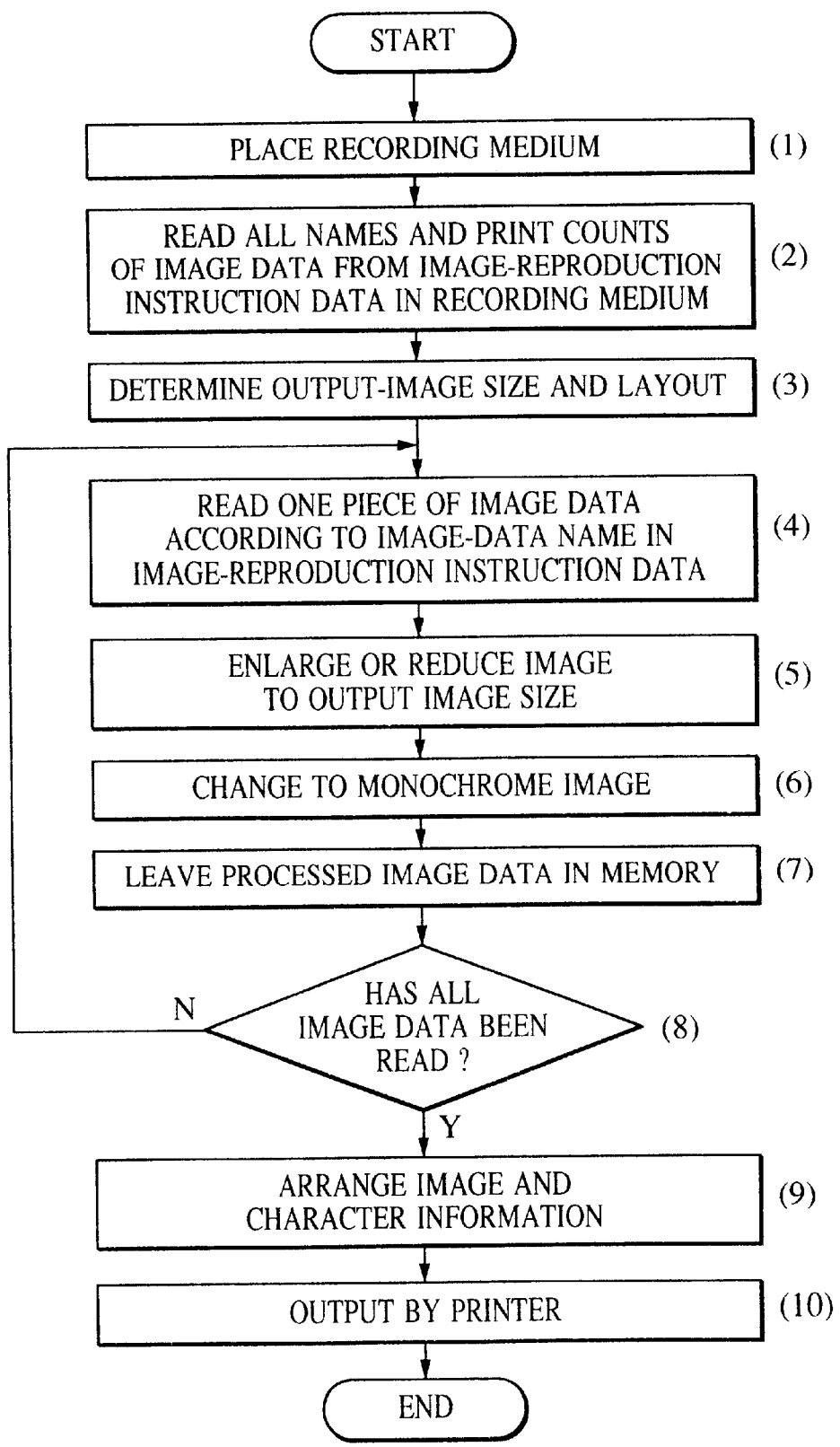
FIG. 4 is a flowchart of a data processing procedure in the image processing apparatus.

FIG. 4 is a flowchart indicating a data processing procedure in the image processing apparatus according to the present invention. Symbols (1) to (10) in the figure indicate steps.

Figure 5:
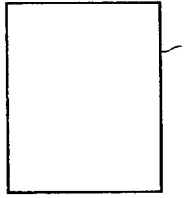
FIG. 5 is a view showing a print order check sheet generated by a print order form generating unit and output by an output unit shown in FIG. 1.
Figure 5:
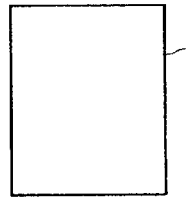
Figure 5:
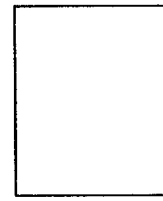
Figure 5:
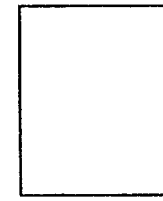
Figure 5:
Figure 5:
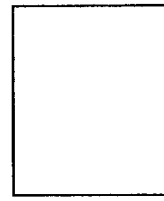
Figure 5:
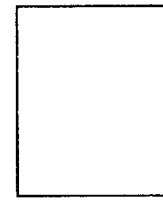

The recording medium 1 in which the image data 5 and the image-reproduction instruction data 4 are recorded is placed in the print order form generating unit 2 in a step (1). The specified-image reading section 6 in the print order form generating unit 2 reads in a step (2) all the numbers or the names and the output counts of the image data 5, recorded in the image-reproduction instruction data 4, and determines an output image size and the layout of image and character information in step (3). Any layout may be used, but all pieces of the information are arranged, for example, within a standard-size sheet as shown in FIG. 5. The output image size and the arrangement may be determined in advance. In this case, the step (3) shown in FIG. 4 is unnecessary.

A print order check sheet will be described by referring to FIG. 5.

FIG. 5 is a view showing a print order check sheet generated by the print order form generating unit 2 and output by the output unit 3 shown in FIG. 1.

In FIG. 5, L1 to L7 indicate arranged images, which are signal-processed by the signal processing section 7, arranged at appropriate positions by the layout processing section 8, and output. In the print order check sheet, the date PF-1, the time PF-2, the name PF-3 of a person who has asked reproduction, the shop name PF-4, and the output count PF-5 may be added as additional information. The information shown below each of the arranged images L1 to L7 includes the number or the name and the output count of each image data, added to the image data.

According to an image-data name in the image-reproduction instruction data 4 read in the step (2), the corresponding image is read among the image data 5 from the recording medium 1 in a step (4). Enlargement interpolation processing or reduction thinning-out processing (image enlargement/reduction processing) is applied to the image data in a step (5) such that it has the image size determined in the step (3).

When the output unit 3 is a monochrome printer, the color information of the image is discarded to change the image data to a monochrome image data in a step (6). The processed data is left on a memory as the output image data in a step (7).

Then, it is determined in a step (8) whether all images in the image data 5 have been read. If it is determined that not all the images have been read, the procedure returns to the step (4). When it is determined that all the images have been read, the layout processing section 8 actually arranges the image and character information in a step (9) according to the layout determined in the step (3) to generate the output data.

On that occasion, the date PF-1 when the print order check sheet is output, the time PF-2, the name PF-3, the shop name PF-4, and the output count PF-5 may be additionally output as required, as shown in FIG. 5.

The information obtained through the above signal processing and layout processing is output to the output unit 3 in a step (10), and the procedure is ended.

With this procedure, the print order check sheet for the image data 5, based on the image-reproduction instruction data 4 stored in the recording medium 1, can be easily printed. Both the person who has asked image reproduction with the recording medium 1 and the person (service provider) who performs printing processing of the recording medium 1 can check the contents of instructions to the recording medium 1.

Features of the present embodiment will be further described by referring to FIG. 4 and other figures.

A data processing method for the image processing apparatus configured as described above, which can access the recording medium 1 in which the specified number of the image data 5 and the image-reproduction instruction data 4 corresponding to the image data 5 are stored, or a storage medium for storing a program which can be read by a computer and which controls an image processing apparatus that can access the recording medium 1 in which the specified number of the image data 5 and the image-reproduction instruction data 4 corresponding to the image data 5 are stored, includes a reading step (the steps (1) and (2) shown in FIG. 4) for selecting image data according to the image-reproduction instruction data 4 in the recording medium 1 and for reading it; a generating step (the steps (3) to (9) shown in FIG. 4) for generating arranged output data according to the image-reproduction instruction data 4, for each image data selectively read in the reading step; and an output step (the step (10) shown in FIG. 4) for outputting a form sheet used for checking instructions on the image data to be output from the recording medium 1, according to the output data generated in the generating step. Therefore, image-reproduction instruction information which indicates an image the user wants to reproduce is recorded on the same recording medium as image data, a group of image data to be reproduced according to the image-reproduction instruction information can be image-output on the form sheet, and image-data reproduction instructions can be checked before the image data is reproduced. Consequently, it can be easily determined whether the instructions have an error. In addition, since the form sheet and the reproduced image can be verified at any time, when a person who asks image reproduction does not perform image reproduction processing, an error in instructions of the user or the processor and falsification are prevented and the best image-reproduction service can be offered.

A data processing method for an image processing apparatus which can access the recording medium 1 in which the specified number of the image data 5 and the image-reproduction instruction data 4 corresponding to the image data 5 are stored, or a storage medium for storing a program which can be read by a computer and which controls an image processing apparatus that can access the recording medium 1 in which the specified number of the image data 5 and the image-reproduction instruction data 4 corresponding to the image data 5 are stored, includes a reading step (the steps (1) and (2) shown in FIG. 4) for selecting image data according to the image-reproduction instruction data 4 in the recording medium 1 and for reading it; a generating step (the steps (3) to (9) shown in FIG. 4) for generating arranged output image data according to the image-reproduction instruction data 4, for each image data selectively read in the reading step; and an output step (the step (10) shown in FIG. 4) for outputting the arranged output image data generated in the generating step. Therefore, a person who performs image-reproduction processing can efficiently obtain the required number of reproduction images by efficiently reading the intended image data among the image data 5 recorded in the recording medium 1 passed by a person who has asked image reproduction.

Second embodiment

An embodiment in which the above system is used will be described below.

For example, a printing service company holds the print order form generating unit 2 and the output unit 3. The customer brings the recording medium 1 in which the image-reproduction instruction data 4 and the image data 5 are recorded to the printing service company, which is provided with the above system, and asks for high-quality printing.

At this time, the printing service company generates a print order form (print order check sheet) by the use of the print order form generating unit 2 and the output unit 3. When the customer receives this form, the customer can check the contents of the recording medium 1, which the customer passed to the company, and change the contents at this point if an error is found.

The print order form itself can be a contract. In case the printing service company intentionally changes the image-reproduction instruction data 4 stored in the recording medium 1, or if the company erroneously outputs a high-quality print of another image, the customer can point out the error just by showing the print order form.

A structure of a data processing program which can be read by the image processing system according to the present invention will be described below by referring to a memory map shown in FIG. 6.

FIG. 6 shows a memory map of a recording medium where various data processing programs are stored which can be read by a printing system to which the image processing system according to the present invention can be applied.

Although not specifically shown in the figure, information for controlling program groups stored in the recording medium, such as version information and the name of a programmer, is also stored. Information dependent on the operating system used in the portion that reads a program, such as an icon displayed on a screen and used for identifying the corresponding program, may also be stored.

Data for various programs are also controlled in a directory. A program for installing each application program into the computer, and an expanding program for a compressed application program to be installed may also be stored.

The function shown in FIG. 4 in the present embodiment may be achieved by the host computer with the use of a program installed externally. In this case, even if an information group, including the program, is supplied to the output unit by a recording medium such as a CD-ROM, a flash memory, and a floppy disk, or by an external recording medium through a network, the present invention can be applied.

As described above, it is a matter of course that the object of the present invention is also achieved in a case in which a recording medium for storing the program code of software that implements the function in the present embodiment is supplied to the system or the unit, and the computer (CPU or MPU) of the system or the unit reads the program code stored in the recording medium and executes it.

In this case, the program code itself read from the recording medium implements a novel function of the present invention. Therefore, the recording medium which stores this program code is a part of the present invention.

As the recording medium which stores the program code, a floppy disk, a hard disk, an optical disk, a magneto-optical disk, a CD-ROM, a CD-R, a magnetic tape, an nonvolatile memory card, a ROM, and an EEPROM can be used.

The present invention includes not only a case in which the computer executes the read program code to implement the above function of the embodiment but also a case in which the operating system running on the computer performs a part or the whole of the actual processing according to the instructions of the program code and the function is achieved by that processing.

The present invention also includes a case in which the program code read from the recording medium is written into a memory of a function extension board inserted into the computer or a function extension unit connected to the computer, and the CPU provided for the function extension board or the function extension unit performs a part or the whole of the actual processing according to the instructions of the program code and the function is achieved by that processing.

Third embodiment

A third embodiment shows a more specific arrangement in the print order form used in the above embodiments.

It is preferred that the size of the print order form be constant in terms of cost irrespective of the number of prints the customer orders. When the fixed size of thumbnail images is used in the print order form, if a small number of images are printed, the print order form has a large vacant area. Conversely, if a large number of images are printed, some images may be out of the form. To improve this condition, the present embodiment shows a system in which the size and layout of thumbnail images are changed according to the number of prints ordered.

Figure 7:
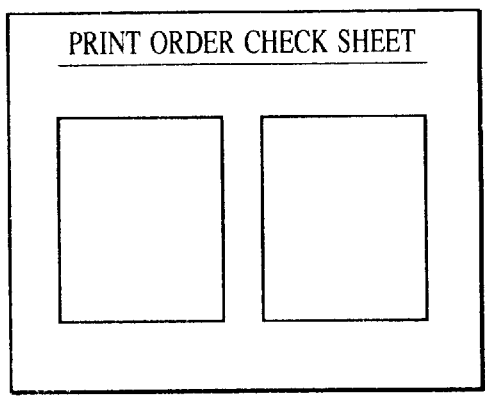
FIGS. 7(1)–7(4) are views showing other types of print order check sheets.
Figure 7:
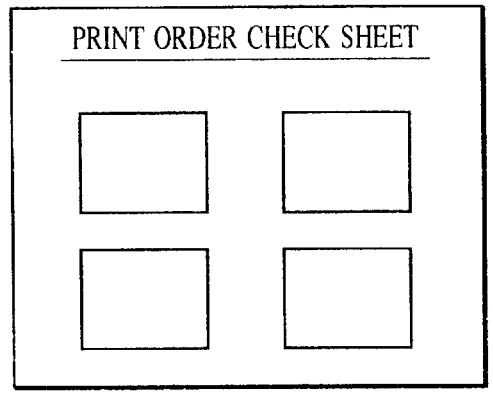
Figure 7:
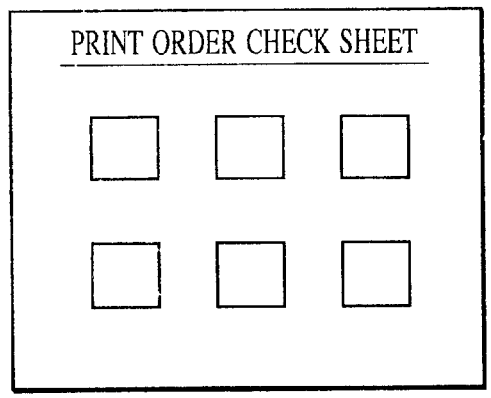
Figure 7:
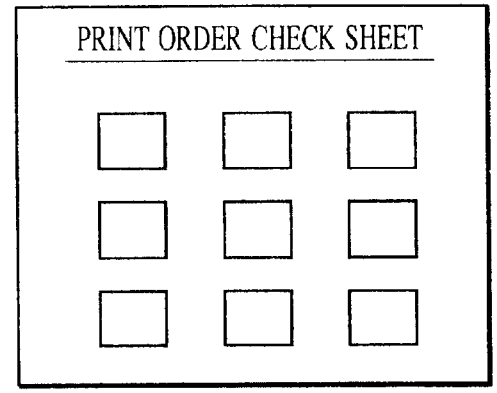

The size and layout are set, for example, as shown in FIG. 7. FIG. 7(1) shows a display method of thumbnail images in a case one or two image prints are ordered. FIG. 7(2) shows a display method of thumbnail images in a case three or four image prints are ordered. FIG. 7(3) shows a display method of thumbnail images in a case five or six image prints are ordered. FIG. 7(4) shows a display method of thumbnail images in a case seven to nine image prints are ordered.

To implement the foregoing display methods, the processing flow shown in FIG. 4 is basically followed. The step (3) in FIG. 4, in which the size and layout of output images are determined, will be described in detail. A table shown in FIG. 8 is referenced according to the value of N, where N indicates the number of different images to be printed, and the information of the size and layout of thumbnail images are obtained. In FIG. 8, a first column indicates the number of different images to be printed, second and third columns indicate the numbers of thumbnail images to be arranged in the horizontal and vertical directions in a print order form, respectively, and fourth and fifth columns indicate the sizes of the thumbnail images in the horizontal and vertical directions, respectively. According to this information, the thumbnail images can be arranged automatically. This table is stored in a memory not shown in FIG. 1.

Fourth embodiment

Another display method of thumbnail images on the print order form will be described in a fourth embodiment.

In the display method shown in FIG. 5, that is, in the method in which thumbnail images are displayed and the names and the print counts corresponding thereto are displayed below the thumbnail images, the images to be printed are easy to see but it is difficult to understand how many prints of each image are obtained, in terms of the sense of sight.

Figure 10:
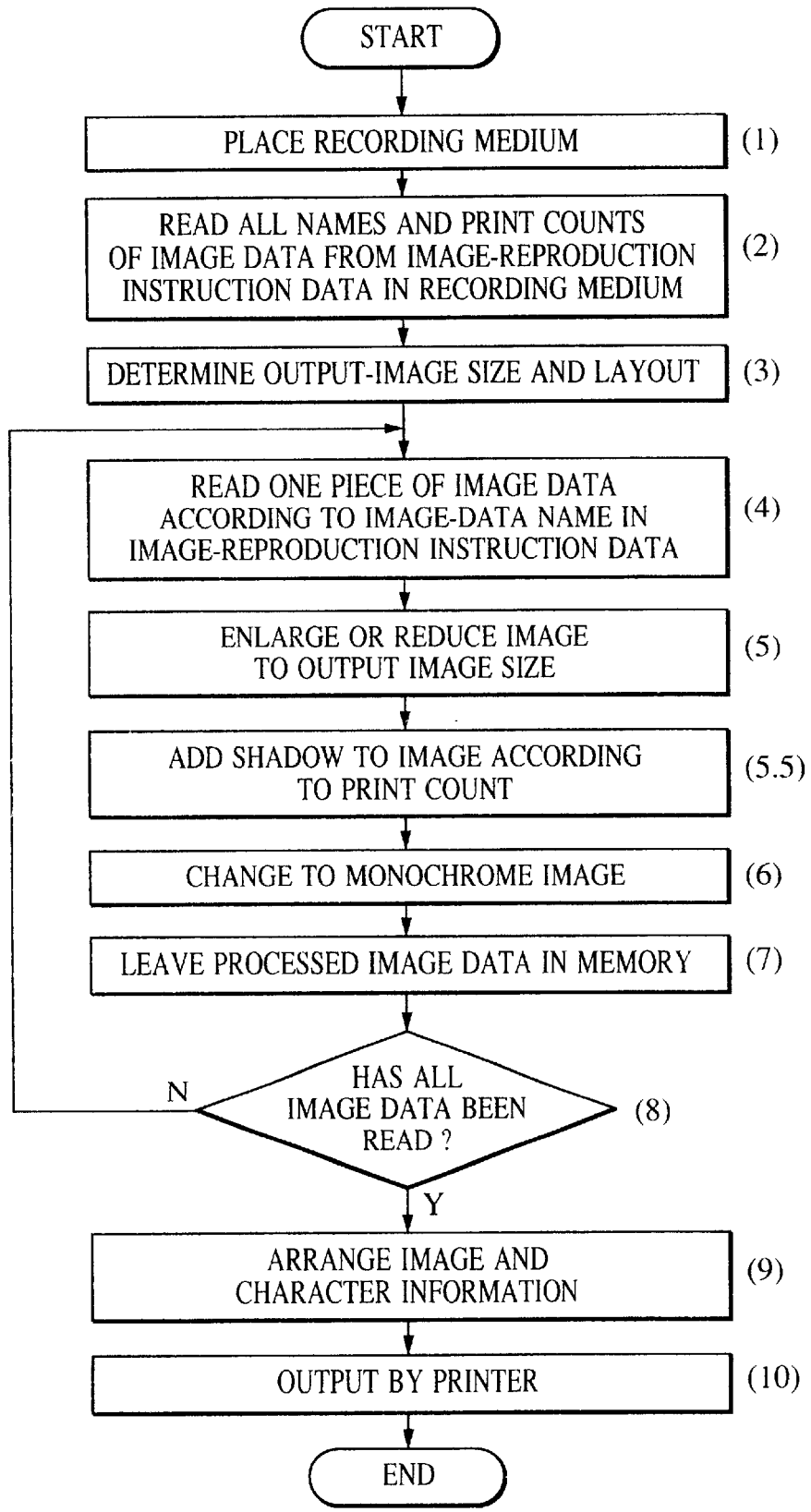
FIG. 10 is a flowchart of a data processing procedure used for outputting the print order check sheet shown in FIG. 9 in the image processing apparatus.

In the present embodiment, the display method is changed to that shown in FIG. 9 to improve the foregoing situation. FIG. 10 shows a flowchart of the display method, which is obtained by adding a step (5.5) to the flowchart shown in FIG. 4. In the step 5.5, a shadow is added to a thumbnail image according to the print count thereof. With this step being added, a print order form in which the print count of each image becomes easier to understand in terms of the sense of sight can be generated. In a case in which a greatly large number of prints are to be made, an upper limit may be specified to the print count for which a shadow is added in order to handle the case.

According to the above embodiments, from a recording medium in which image data and image-reproduction instruction data are stored, the image-reproduction instruction data is read, appropriate thinning-out processing and changing-to-monochrome-data processing by dropping color information are applied to all image data for which reproduction is specified, and image-reproduction data information, including the arranged image data with the numbers or names and the print counts of the images being added as required, is output on a print order form. Therefore, since the reproduction instruction data information is printed on the print order form before high-quality printing is performed, whether the desired images and the desired print counts are specified can be checked before high-quality printing is performed.

In case the image-reproduction instruction data is falsified after the check, the printed reproduction instruction data and the images printed in high quality can be verified to point out the falsification of the image-reproduction instruction data.

Even after high-quality printing is performed, if the original image-reproduction instruction data is different from the printed data, the difference can be pointed out.

What is claimed is:

1. An image processing apparatus comprising:
   a recording medium in which a specified number of certain image data and an image-reproduction instruction data corresponding to the image data are stored;
   reading means for selecting image data according to the image-reproduction instruction data stored in said recording medium and for reading the selected image data;
   generating means for generating output data arranged according to the image-reproduction instruction data which is corresponding to the image data and which is stored in said recording medium, for each image selectively read by said reading means; and
   output means for outputting a sheet used for checking the instructions on the image data to be output from said recording medium, according to the output data generated by said generating means without selecting action by a user,
   wherein said sheet is composed of only the images reproduced in accordance with said image-reproduction instruction.

2. An image processing apparatus according to claim 1, wherein said recording medium is portable.

3. An image processing apparatus according to claim 1, wherein said recording medium is formed so as to be able to be mounted to a digital camera.

4. An image processing apparatus according to claim 1, wherein an image indicating the output count of each image data is added to the image data.

5. An image processing apparatus according to claim 1, wherein the image output onto said sheet is changeable in accordance with the information of the print count of the image designated by said image-reproduction instruction.

6. An image processing apparatus according to claim 1, wherein the arrangement of the image output onto said sheet is changeable in accordance with the number of images designated by said image-reproduction instruction.

7. A data processing method for an image processing apparatus which accesses a recording medium in which a specified number of certain image data and an image-reproduction instruction data corresponding to the image data are stored, said data processing method comprising:
   a reading step of selecting image data according to the image-reproduction instruction data stored in said recording medium and for reading the selected image data;
   a generating step of generating output data arranged according to the image-reproduction instruction data which is corresponding to the image data and which is stored in said recording medium, for each image data selectively read in said reading step; and
   an output step of outputting a sheet used for checking the instructions on the image data to be output from the recording medium, according to be output data generated in said generating step without any selecting action by a user,
   wherein said sheet is composed of only the images reproduced in accordance with said image-reproduction instruction.

8. A data processing method according to claim 7, wherein the recording medium is portable.

9. A data processing method according to claim 7, wherein the recording medium is formed so as to be able to be mounted to a digital camera.

10. A data processing method according to claim 7, wherein an image indicating the output count of each image data is added to the image data.

11. An image processing method according to claim 7, wherein the image output onto said sheet is changeable in accordance with the information of the print count of the image designated by said image-reproduction instruction.

12. An image processing method according to claim 7, wherein the arrangement of the image output onto said sheet is changeable in accordance with the number of images designated by said image-reproduction instruction.

13. A storage medium for storing a program which is readable by a computer and which controls an image processing apparatus that accesses a recording medium in which a specified number of certain image data and an image-reproduction instruction data corresponding to the image data are stored, said program comprising:
   program code for a reading step of selecting image data according to the image-reproduction instruction data stored in said recording medium and for reading the selected image data;
   program code for a generating step of generating output data arranged according to the image-reproduction instruction data which is corresponding to the image data and which is stored in said recording medium, for each image data selectively read in said reading step; and
   program code for an output step of outputting a sheet used for checking the instructions on the image data to be output from the recording medium, according to the output data generated in said generating step without any selecting action by a user,
   wherein said sheet is composed of only the images reproduced in accordance with said image-reproduction instruction.

14. A storage medium according to claim 13, wherein the recording medium is portable.

15. A storage medium according to claim 13, wherein the recording medium is formed so as to be able to be mounted to a digital camera.

16. A storage medium according to claim 13, wherein an image indicating the output count of each image data is added to the image data.

17. An image processing apparatus for reproducing an image from a recording medium in which a plurality of images and image-reproducing instruction data corresponding to the plurality of images are stored, said apparatus comprising:
   reading means for selecting an image according to the image-reproducing instruction data and for reading the image;
   generating means for generating output data according to the image-reproducing instruction data for selectively read image data; and
   output means for outputting a sheet used for checking the instructions on the image data to be output from the recording medium, according to the output data generated by said generating means,
   wherein, with respect to an image to be arranged on the sheet, an image not instructed by the image-reproducing instruction data is not used, but an image instructed by the image-reproducing instruction data is used, among images recorded in the recording medium.

18. An image processing apparatus according to claim 17, wherein information as to a number of output sheets for each of images instructed by the image-reproducing instruction data is also added to the sheet.

19. An image processing apparatus according to claim 17, wherein the image to be output on the sheet is changeable according to information as to a number of output sheets which is designated by the image-reproducing instruction data.

20. An image processing apparatus according to claim 17, wherein an arrangement of an image to be output on the sheet is changeable according to a number of images to be designated by the image-reproducing instruction data.

21. An image processing method for reproducing an image from a recording medium in which a plurality of images and image-reproducing instruction data corresponding to the plurality of images are stored, said method comprising:

a reading step of selecting an image according to the image-reproducing instruction data and for reading the image;

a generating step of generating output data according to the image-reproducing instruction data for selectively read image data; and an output step of outputting a sheet used for checking the instructions on the image data to be output from the recording medium, according to the output data generated by said generating step, wherein, with respect to an image to be arranged on the sheet, an image not instructed by the image-reproducing instruction data is not used, but an image instructed by the image-reproducing instruction data is used, among images recorded in the recording medium.

22. An image processing method according to claim 21, wherein information as to a number of output sheets for each of images instructed by the image-reproducing instruction data is also added to the sheet.

23. An image processing method according to claim 21, wherein the image to be output on the sheet is changeable according to information as to a number of output sheets which is designated by the image-reproducing instruction data.

24. An image processing method according to claim 21, wherein an arrangement of an image to be output on the sheet is changeable according to a number of images to be designated by the image-reproducing instruction data.

25. A storage medium for storing a program which is readable by a computer and which controls an image processing apparatus that accesses a recording medium in which a specified number of certain image data and an image-reproduction instruction data corresponding to the image data are stored, said program comprising:

program code for a reading step of selecting an image according to the image-reproducing instruction data and for reading the image;

program code for a generating step of generating output data according to the image-reproducing instruction data for selectively read image data; and program code for an output step of outputting a sheet used for checking the instructions on the image data to be output from the recording medium, according to the output data generated by said generating step, wherein, with respect to an image to be arranged on the sheet, an image not instructed by the image-reproducing instruction data is not used, but an image instructed by the image-reproducing instruction data is used, among images recorded in the recording medium.

* * * * *

UNITED STATES PATENT AND TRADEMARK OFFICE
CERTIFICATE OF CORRECTION

PATENT NO.    : 6,493,108 B1
DATED         : December 10, 2002
INVENTOR(S)   : Shinya Hirai It is certified that error appears in the above-identified patent and that said Letters Patent is hereby corrected as shown below:

Column 2,
Line 63, "an" should read -- an error, --.

Column 7,
Line 15, "an" should read -- a --.

Column 11,
Line 34, "an" should read -- a --.

Column 13,
Line 54, "be" should read -- the --.

Signed and Sealed this

Fifteenth Day of July, 2003

JAMES E. ROGAN
*Director of the United States Patent and Trademark Office*